Aug. 15, 1944. F. A. CONTERMAN Re. 22,528

WASHING MACHINE

Original Filed Jan. 2, 1937 3 Sheets-Sheet 1

Inventor
Fred A. Conterman

By Richmond S. Hayes
Attorney

Aug. 15, 1944. F. A. CONTERMAN Re. 22,528

WASHING MACHINE

Original Filed Jan. 2, 1937 3 Sheets-Sheet 2

Inventor
Fred A. Conterman

By Richmond S. Hayes
Attorney

Aug. 15, 1944. F. A. CONTERMAN Re. 22,528

WASHING MACHINE

Original Filed Jan. 2, 1937 3 Sheets-Sheet 3

Inventor
Fred A. Conterman

By Richmond S. Hayes
Attorney

Reissued Aug. 15, 1944

Re. 22,528

UNITED STATES PATENT OFFICE 22,528

WASHING MACHINE

Fred A. Conterman, Jamestown, N. Y., assignor to Jamestown Metal Equipment Company, Inc., Jamestown, N. Y., a corporation of New York Original No. 2,220,476, dated November 5, 1940, Serial No. 118,710, January 2, 1937. Application for reissue October 19, 1942, Serial No. 462,561

9 Claims. (Cl. 68—134)

This invention relates to power driven washing machines and more particularly to the structure of an agitator therefor.

As has frequently been the case in the rapid development of other machines, development of washing machines has been concentrated on certain few improvements, and in particular, provision of means for agitating articles with little or no rubbing contact of the articles by the source of agitation. It was believed that washable materials would continue more serviceable if not subjected to the contact beating and churning inherent in earlier machines. It was thought that the materials should be tumbled and twisted about solely through movement of the liquid in a washing machine tub in order to prevent wearing and tearing contact with the agitating means. In washing certain articles such as those composed of fine and frail textures, it may be advisable to utilize an agitating mechanism which causes the articles to be cleaned by the turbulent action of the liquid alone. These articles, however, constitute a very small portion of the articles generally cleaned in a washing machine. To properly clean the average article in a washing machine, it has been found necessary that the article not only be twisted, turned, and moved rapidly through the liquid, but it must, to some extent, contact the source of turbulence or agitation to effect complete removal of dirt that has been loosened through action of soap.

In the development of an agitator best suited to the general needs of the users of washing machines, the first consideration must be that an agitator be ineffectual to damage the article being washed. A further requirement in the development of an agitator is to provide one that will properly clean the article during the washing process. Furthermore, an agitator must be capable of creating substantially the same turbulence when operating in a tub completely filled with articles as when operating in a tub only partially filled. Inasmuch as it is practically impossible to create sufficient turbulence in a filled tub with an agitator which is not intended to contact the articles, such an agitator can only have practical application when utilized in the cleaning of a few articles at a time. For instance, when a tub is filled to its contemplated capacity, some of the articles contained therein must directly contact the agitator. If the agitator is of a type which tends to circulate the articles being washed in a vertical plane, that is, radially outwardly toward the wall of the tub, those articles adjacent the wall will be disturbed hardly at all and be improperly cleaned. Furthermore, in order that all articles in a filled tub be thoroughly cleaned, it is imperative that the articles be circulated not merely up and down, but laterally about the tub so that those articles adjacent the tub wall, when the agitator is started, will work their way toward and into contact with the agitator several times during the cleaning operation.

Consideration must also be given to the provision of an agitator which will not tangle, twist, or tie articles in knots. If the direction of flow of the liquid due to oscillation of an agitator, is in a vertical plane, the articles are moved in bunches and constantly twist and turn together in the same direction, thereby working themselves into tangles and knots. To prevent this an agitator must produce a flow of liquid in the tub that is irregular, both as to force and direction. In other words, oscillation in one direction must create a flow not only opposite to the flow resulting from oscillation in the other direction, but irregular with respect thereto as well. Such irregularity of flow of the liquid tends to constantly move the articles about the tub in an irregular course. This can best be accomplished through the provision of an agitator which is non-symmetrical.

The present invention is primarily directed to the provision of an agitator for a power driven washing machine which tends to move articles being washed about the tub in a generally horizontal direction in small circles, the diameter of which for purposes of illustration, may be considered as the distance between the agitator hub or support and the nearest portion of the tub wall. This motion of the articles during the process of washing is made possible through the provision of an agitator, preferably located centrally of a circular tub, which has somewhat the appearance of a paddle wheel. The structure provides a plurality of open sided compartments, the openings being directed toward the tub wall. The agitator is rotated first in one direction and then the other about a suitable shaft projecting upwardly through the base of the tub and which is in turn connected with any conventional motive means.

One of the objects of the invention lies in the provision of an agitator for a washing machine which circulates articles being washed in devious lateral paths about the tub.

Another object of the invention lies in the provision of an agitator which is non-symmetrical and causes an irregular flow of liquid about the tub, both as to force and direction.

Another object of the invention lies in the provision of an agitator for a washing machine which tends to circulate the articles being washed in a horizontal direction in small circles or whirlpools.

Another object of the invention lies in the provision of an agitator for a washing machine which causes the cleaning liquid to be swirled in small lateral circles bringing the articles into repeated contact with the agitator.

Another object of the invention lies in the provision of an agitator for a washing machine which, during a washing period, tends to flex individual articles by short periodic engagement therewith resulting in a rapid whipping and swishing of the article.

Another object of the invention lies in the provision of an agitator for a washing machine which in appearance resembles a paddle wheel mounted to operate about a vertical shaft.

Another object of the invention lies in the provision of an agitator for a washing machine which, by reason of the provision of outwardly opening pockets, during reciprocation creates a suction producing a number of horizontal whirlpools that give the articles temporary engagement with the agitator.

Another and further object of the invention lies in the provision of an agitator for a washing machine which takes the form of a multiple bladed paddle wheel mounted on a vertical shaft, the edges of the blades being enclosed by disks to provide single open sided pockets or buckets.

Other and further objects of the invention may be more fully understood from a consideration of the following specification taken in conjunction with the accompanying drawings and in which Fig. 1 is a side elevation, partly in section, of a washing machine embodying one form of the agitator structure of the invention;

Figure 1:
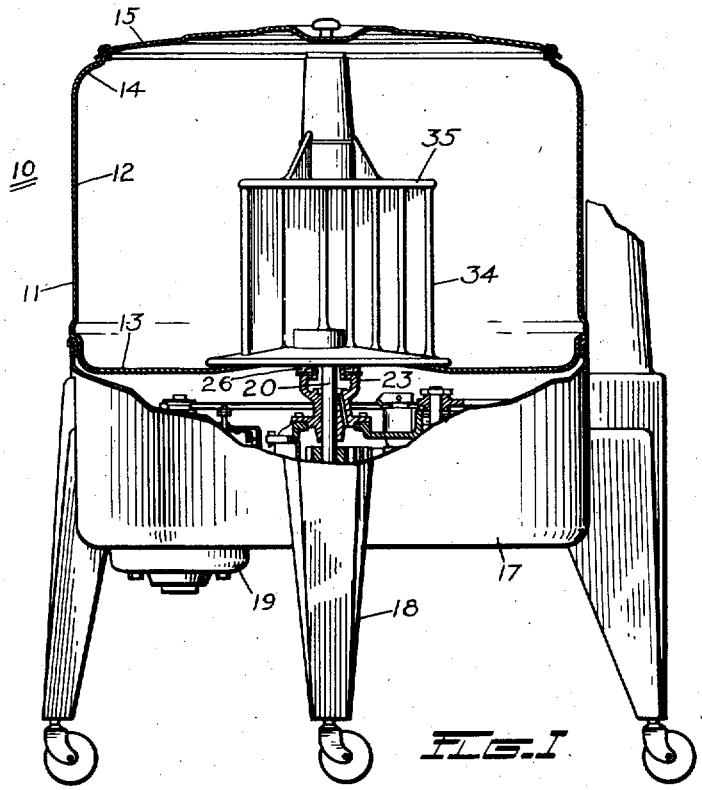
Figure 2:
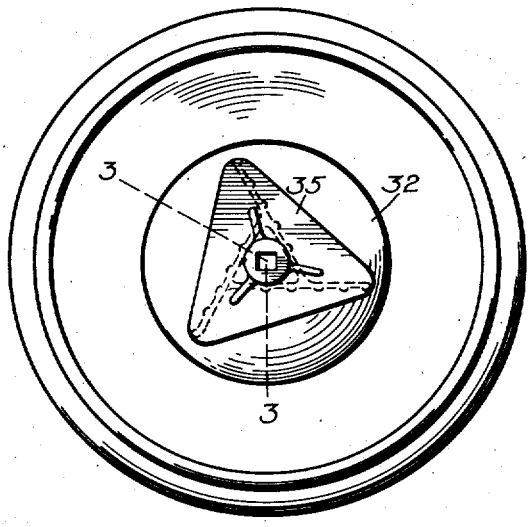
Fig. 2 is a plan view of the washing machine of Figure 1 with the cover removed, showing the agitator in position in the tub.

Referring to the drawings, one modification of a washing machine is shown, being generally indicated by the reference numeral 10. The machine includes a tub 11 consisting of a circular side wall 12, substantially flat base wall 13, and conventional inturned or rolled upper edge 14 which constitutes a seat for a cover 15. The tub 11 is mounted in any suitable manner on a base member 17 which is in turn supported by legs 18. Located in the base member 17 is a suitable motor 19 which drives and reciprocates a vertically positioned shaft 20 in a manner conventional to structures of this class, as for example, through mechanism 21.

Located in the base member 17 is a housing 23 which includes suitable bearings for the lower end of shaft 20. The housing 23 projects upwardly through an opening in the center of the base wall 13 of the tub, and within the tub takes the form of a hollow post 24. Immediately adjacent the base wall 13 of the tub the post 24 is threaded to receive a collar 25. Suitable packing 26 encircles a flange of the housing 23 directly beneath the base wall 13, and further packing 27 encircles the post 24 between the collar 25 and base wall 13. When the collar 25 is turned down on the post, the packing 26 and 27 is compressed and the unital housing and post 23 and 24 is rigidly secured to the tub. Suitable bearings may be provided in the housing 23 for supporting the shaft 20. The upper end of the shaft projects through and above the post 24 and is adapted to mount a drive block 29. A suitable key or pin secures block 29 in position on the shaft 20. The outer surface of the block 29 is formed with flat converging sides (preferably four) and constitutes the mounting means for an agitator hereinafter fully described.

An agitator generally indicated by the reference numeral 30 is located in the tub 11 and in one form (see Figures 3 and 4) comprises a disk-like base 32 which is preferably slightly dished to conform to the central dished portion of the base wall 13 of the tub. Projecting upwardly from the center of the base 32 is a hub 33. A number of blades 34 are arranged substantially tangential to the hub 33. In the modification under consideration three blades 34 are provided, and in consequence, the vertical edge of one blade abuts or joins an adjacent blade substantially centrally thereof. In this manner a triangle is formed about the hub 33. The blades extend outwardly from the hub 33 to adjacent the circumferential edge of the base 32. The height of the blades may be varied but, as shown in the drawings, are somewhat greater than half the height of the hub 33. A plate 35 is located upon the upper edges of the blades 34, and in one form is triangular. This plate may, however, be circular and of a diameter corresponding to that of the disk 32. It will be understood that there are three compartments 36 in the agitator and that each compartment is formed by the entire face 37 of one blade, part of the face 38 of an adjoining blade, disk 32, and plate 35. With the exception of the difference in shape between disk 32 and plate 35, the agitator has an appearance somewhat similar to a turbine wheel or enclosed paddle wheel. Inasmuch as it is contemplated that the agitator is to contact articles during the cleaning process for the purpose of twisting and flexing said articles, it may be advantageous to provide a plurality of ribs 39 on each of the blades 34.

Figure 3:
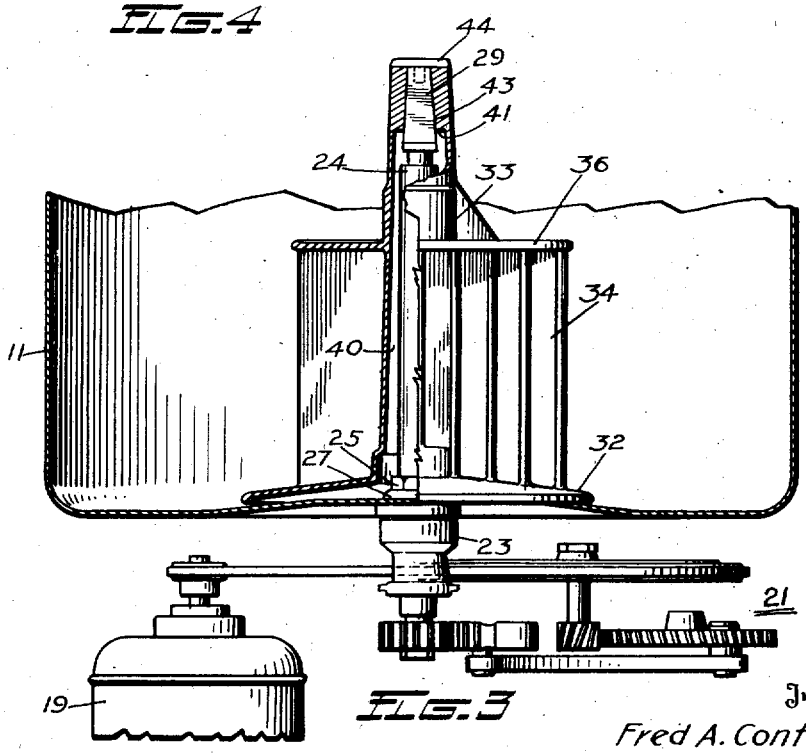
Fig. 3 is an enlarged fragmentary vertical sectional view of the agitator showing the drive and mounting therefor, being taken substantially on the lines 3—3 of Figure 2.

Referring particularly to Figure 3, it will be understood that the hub 33 of the agitator is formed with an opening 40. This opening is preferably slightly tapered, being smaller at shoulder 41 than adjacent the disk-like base 32. Continuing upwardly from the shoulder 41 is a square opening 43 having walls inclined to the same inclination as the sides of the drive block 29. Block 29 constitutes the sole support for the agitator and projects upwardly through the hub 33 stopping flush with the upper end thereof. The upper end of the drive block is formed with a threaded opening with which a cap screw 44 is engaged to draw the hub 33 downwardly onto the drive block 29 and secure it for operation.

Figure 8:
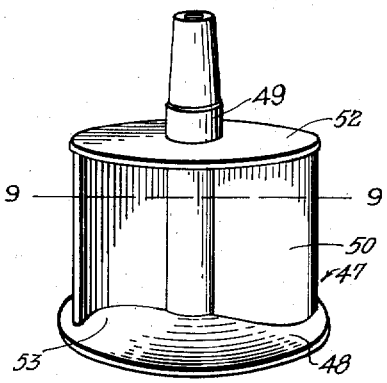
Fig. 8 is a perspective view of a modification of the agitator shown in Figure 4.
Figure 9:
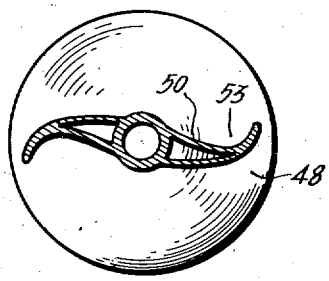
Fig. 9 is a horizontal sectional view taken substantially on the line 9—9 of Figure 8.

Inasmuch as the operation of each of the three modifications of agitators shown, as well as their results, are substantially identical, attention is now directed to the structure of Figures 8 and 9. In this instance an agitator, indicated by the reference numeral 47, is shown to comprise a base member 48 in the center of which is an upstanding hub 49 substantially identical with the hub 33 heretofore described. A pair of opposed blades 50 are located on the base member 48 which project in substantially opposite directions. These blades are arranged substantially tangential to the circular hub 49 similarly to the blades 34. A top plate 52 completes the structure and forms, with the base 48 and blades 50, two opposed open sided compartments 53. It is to be noted that the blades are shown formed with a straight surface connecting a continuously variable curve, and that the compartments or pockets have no inside vertical angle. The general contour, however, of each compartment in this modification is substantially identical with the contour of the three bladed, three compartment agitator heretofore described. In this modification, however, the agitator may be more readily adapted for use in small capacity washing machines and may, if desired, be reciprocated more rapidly.

Figure 4:
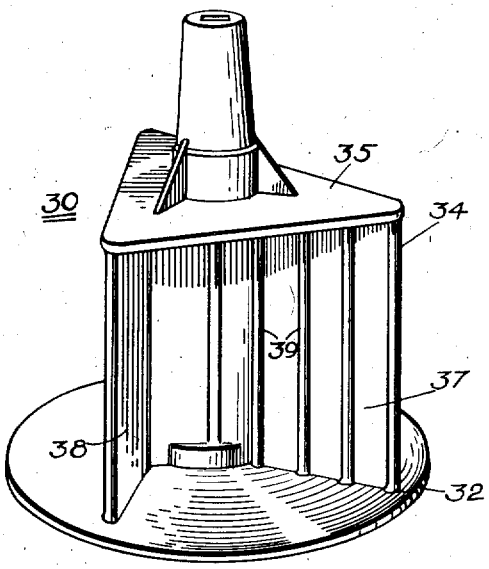
Fig. 4 is a perspective view of the agitator, shown in Figures 1, 2, and 3, removed from the tub.
Figure 5:
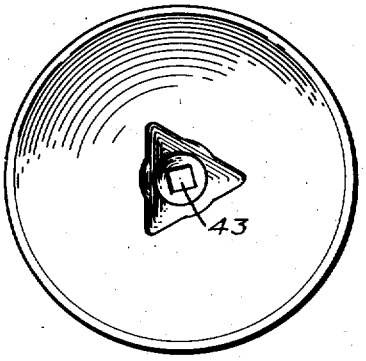
Fig. 5 is a bottom plan view of the agitator.
Figure 10:
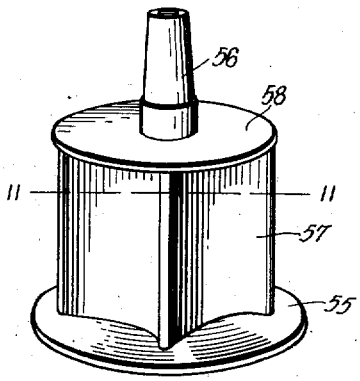
Fig. 10 is a perspective view of a further modification of the agitator.
Figure 11:
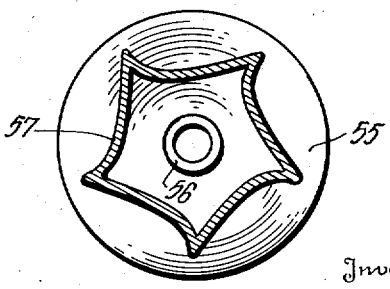
Fig. 11 is a horizontal sectional view taken on the line 11—11 of Figure 10.

The further modification shown in Figures 10 and 11 provides a base member 55, in the center of which is an upstanding hub 56. Enclosing the hub 56 are blades 57 which may be formed by joining faces of adjacent blades, as shown in the modification of Figure 4, or in a continuously increasing curve as shown in these figures. A top plate 58 is located on the upper edges of the blades 57 and, together with the base 55, provides five open sided compartments. This modification of the agitator is adapted to be mounted on the drive shaft of the washing machine in a manner identical with that heretofore described.

Figure 6:
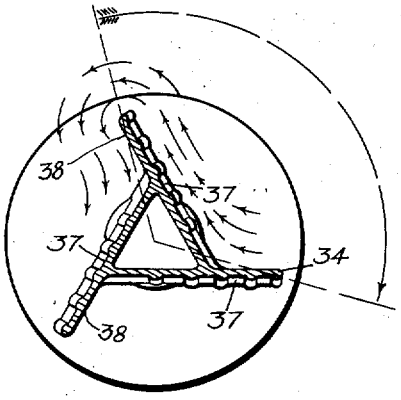
Fig. 6 is a horizontal sectional view of the agitator showing the blades, and shows by arrows the turbulence set up when the agitator is rotated in a clockwise direction.

Having described the structure embodying my invention, operation thereof is as follows. The tub 11 is filled with washing liquid and the articles to be cleaned placed therein. With the articles in the tub, the level of the liquid, for best operation, should be somewhat above the top plate of the agitator. It is to be assumed that the agitator is started and the first oscillation thereof takes place in a horizontal plane in the direction of the arrow indicated in Figure 6. Rotation of the agitator in this direction causes the surfaces 37 of the blades 34 to lead in a circular path about the tub. Since these surfaces are of considerable area, a large amount of liquid is displaced and this takes the form of a more or less definite flow along the surfaces 37 toward and beyond the free edges of the blades. This is due to the fact that each blade is arranged at greater than a right angle to its direction of movement and provides an inclined surface which creates and directs a flow of the liquid. It is obvious that as the liquid flows into the compartments of the agitator and moves along toward the trailing edge of each surface 37, certain of the articles in the tub will be carried with this flow and be flexed and rubbed against the surfaces 37 before they move beyond the trailing edge of each blade. It is to be understood that surface 38, together with a portion of the surface 37, forms a pocket which trails the leading outer edge of each blade. This pocket creates a suction which tends to bend the flow of liquid around the free edge of the blade into the following compartment. Of course, some of the articles being cleaned will follow this flow around the edge of the blade and be flexed and turned during the process. In practical use the pockets formed by the surface 38 and a part of surface 37 have sufficient suction to create small whirlpools into which some of the articles are drawn before they again move along the surface 37 and from off the free edge thereof.

Figure 7:
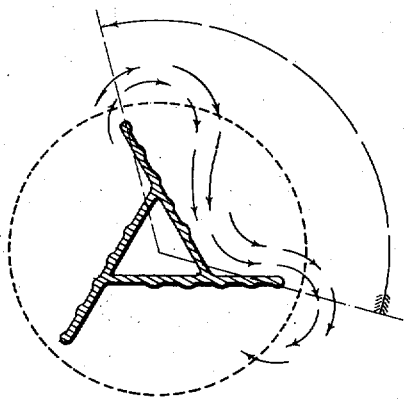
Fig. 7 is a view similar to Figure 6 further showing the turbulence set up in the tub when the agitator is rotated in a counter-clockwise direction.

Rotation of the agitator in a counter-clockwise direction (see Figure 7) causes the surface 38 to lead. This surface forms a part of the pocket previously mentioned, and is more nearly at right angles to the direction of rotation. Consequently, the liquid moves into the compartment along the surface 37 and abruptly onto surface 38 with greater force than was the case when surface 37 was leading and the agitator rotating in the opposite direction. The articles moving with the liquid are forced somewhat away from the agitator and swing in a large circle back into the next compartment and along the surface 37 thereof.

Attention is directed to the fact that the action on the liquid in the tub set up by the agitator in one direction is somewhat different from that in the opposite direction. The purpose of this is two fold. First, to create an irregular flow of the liquid for the purpose of constantly circulating the articles in the tub, and second, to create an irregular whipping and swishing of the articles for the purpose of preventing twisting and tangling. Past experience has demonstrated that a uniform flow of liquid in a washing machine is undesirable because of the tendency of articles to constantly twist and turn in the same direction and thereby work themselves into tangles, bunches, and sometimes knots.

The modified form of blade shown in Figures 8 and 10 does not alter the action on the liquid, since these blades are also provided with large surfaces, which when leading, are inclined obliquely to the direction of rotation. Further, the rounded outer ends of the blades form pockets which create a suction in a manner similar to the pockets created by surface 38 and part of surface 37 of the blades 34 heretofore described. Rotation in the opposite direction causes these rounded pockets to lead and move the liquid more violently laterally outwardly of the agitator, thus producing substantially the action described in connection with rotation of the agitator shown in Figure 7. Although a two bladed agitator will not create as substantial a directed flow of the washing liquid as will a three bladed agitator, it is contemplated that an agitator with two blades may be successfully utilized in a smaller tub or in washing articles which are not greatly soiled.

Each blade of the five bladed agitator shown in Figure 10 functions substantially identically with that of the three bladed agitator. In this instance, however, the blades and pockets are smaller and the liquid is caused to move through its devious paths with less force and violence. However, since there are five blades instead of two or three, there is more opportunity for each article to be contacted by a blade and swished and whirled through the liquid than with a fewer bladed agitator. Furthermore, circulation of the articles within the tub is apt to be slower, with the result that each article is subjected to the twisting and turning flow of liquid along the blades, as well as contact with the blades, over a longer period of time, with the result that a more thorough cleansing of the article may occur.

Although applicant has shown and described only three modifications of a multiple bladed agitator which is closed top and bottom, it will be understood that the number, size, and contour of blades, depth and shape of pockets and compartments and other modifications may be made and are contemplated in so far as these modifications may be within the scope of the invention as defined in the hereunto annexed claims.

Having thus set forth my invention what I claim as new and for which I desire protection by Letters Patent is:

1. An agitator for a washing machine having a plurality of upstanding blades arranged to form a hub enclosing portion, said portion taking the form of an equilateral triangular prism, said blades being arranged to provide pairs of adjacent surfaces, one of said surfaces being at least twice the length of the other of said surfaces, plates on the top and bottom edges of said blades, said plates and pairs of adjacent surfaces together forming open sided pockets.

2. An agitator for a washing machine comprising three vertical blades arranged and joined to form a triangular prism, said blades having substantially plane surfaces, the outer edges of said surfaces being in a vertical plane and terminating within the lateral limits of a support for said blades.

3. An agitator for a washing machine comprising a plurality of plane non-radial blades arranged in a triangle to form a hub-like portion, and having fluid and clothes contacting surfaces extending beyond said hub-like portion and terminating within the lateral limits of said agitator in vertically extending edges, plates at opposite edges of said blades, said plates cooperating with said blades to form laterally opening pockets.

4. An agitator for a washing machine comprising three vertical blades arranged and joined to form a triangular prism-like central portion, said blades having substantially plane surfaces, the outer edges of said blades being in a vertical plane and terminating within the lateral limits of top and bottom supports for said blades.

5. An agitator for a washing machine comprising a plurality of plane non-radial blades arranged to form a hub-like portion of the nature of an equilateral triangular prism, and having fluid and clothes contacting surfaces co-planar with and extending laterally beyond said hub-like portion, the outer edges of said blades being in a vertical plane and terminating within the lateral limits of a support for said blades.

6. An agitator for a washing machine comprising a triangular hub-like portion, a base plate, the sides of said hub-like portion being perpendicular to said base plate, a plurality of blades projecting laterally from said hub-like portion, said blades having plane surfaces for fluid and clothes contact, the edges of said blades extending vertically and terminating within the lateral limits of said plate.

7. An agitator for a washing machine comprising a substantially circular base plate, three blades mounted on and extending perpendicular to said plate, said blades being arranged and joined to form a central portion of the nature of an equilateral triangular prism and having fluid and clothes contacting surfaces extending beyond said hub-like portion, the outer edges of said surfaces being in a vertical plane and terminating within the lateral limits of said plate.

8. An agitator for a washing machine comprising three blades arranged to form a central portion of the nature of an equilateral triangular prism and having fluid and clothes contacting surfaces extending beyond said central portion, top and bottom parallel plates, said blades being joined to and extending perpendicular with respect to said plates, the edges of said surfaces being in a vertical plane and all of said blades terminating within the lateral limits of both of said plates.

9. An agitator for a washing machine comprising three blades arranged to form a central portion of the nature of an equilateral triangular prism and having fluid and clothes contacting surfaces extending laterally beyond said central portion, top and bottom plates, said plates being substantially parallel and said blades being joined to and in a plane perpendicular to said plates, the surfaces of said blades together with said plates forming pockets opening in only a lateral direction, the edges of all of said blades being perpendicular to and terminating within the lateral limits of said plates.

FRED A. CONTERMAN.